(12) United States Patent
Eckerle et al.

(10) Patent No.: US 8,113,086 B2
(45) Date of Patent: Feb. 14, 2012

(54) PARKING BRAKE WITH SEPARATE PEDAL PIVOT

(75) Inventors: Brian J. Eckerle, Mancelona, MI (US); Ronald J. Hanna, Mancelona, MI (US); James Allen, Bellaire, MI (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 1090 days.

(21) Appl. No.: 11/691,017

(22) Filed: Mar. 26, 2007

(65) Prior Publication Data
US 2008/0236987 A1 Oct. 2, 2008

(51) Int. Cl.
*G05G 1/00* (2006.01)
*G05G 3/00* (2006.01)
*G05G 1/30* (2008.04)

(52) U.S. Cl. ............. 74/512; 74/560; 74/575; 74/577 R

(58) Field of Classification Search ............ 74/516, 74/560, 531, 575, 512–514, 577 R; 188/79.54; 192/111.12
See application file for complete search history.

(56) References Cited

U.S. PATENT DOCUMENTS

| | | | | |
|---|---|---|---|---|
| 3,511,107 A * | 5/1970 | Yasiro | | 74/512 |
| 3,621,959 A * | 11/1971 | Gale et al. | | 192/111.12 |
| 3,929,033 A * | 12/1975 | Marx | | 74/512 |
| 5,131,288 A * | 7/1992 | Barlas | | 74/512 |
| 5,448,928 A * | 9/1995 | Harger | | 74/523 |
| 5,533,420 A * | 7/1996 | Perisho | | 74/512 |
| 5,588,335 A * | 12/1996 | Strait | | 74/512 |
| 5,832,784 A * | 11/1998 | McCallips et al. | | 74/512 |
| 6,817,264 B2 * | 11/2004 | Hiura et al. | | 74/512 |
| 6,837,127 B2 * | 1/2005 | Schumacher | | 74/512 |
| 2008/0115618 A1* | 5/2008 | Hanna et al. | | 74/512 |
| 2008/0116022 A1* | 5/2008 | Hanna et al. | | 188/79.54 |

* cited by examiner

*Primary Examiner* — Vinh T. Luong
(74) *Attorney, Agent, or Firm* — Gifford, Krass, Sprinkle, Anderson & Citkowski, P.C.; Kevin S. MacKenzie; Dean B. Watson

(57) ABSTRACT

A park brake includes a brake lever that is movable about a primary and secondary pivot. The brake lever selectively rotates about the primary and secondary pivots changing a ratio of rotation of the brake lever relative to a cable.

29 Claims, 10 Drawing Sheets

PARKING BRAKE WITH SEPARATE PEDAL PIVOT

FIELD OF THE INVENTION

The invention relates to automotive parking brakes.

BACKGROUND OF THE INVENTION

Parking brake assemblies are known in the art and may include various mechanisms for locking and unlocking the parking brake. An example of one system includes a pawl and sector design wherein a pawl engages and disengages a sector to allow movement of a parking brake from a locked to an unlocked position. A cable that is associated or attached to the brake lever may display cable travel loss when the parking brake is moved between the locked and unlocked positions. Additionally, such pawl and sector designs may have limitations as to the tolerance variables, costs and durability of the designs.

There is therefore a need in the art for an improved parking brake that limits the amount of cable travel loss, improves tolerance issues, and improves the durability and cost of such parking brakes.

SUMMARY OF THE INVENTION

In one aspect, a park brake includes a brake lever movable about a primary pivot and a secondary pivot. A cable attachment plate is associated with the brake lever. The secondary pivot isolates movement of the brake lever relative to the cable attachment plate.

In another aspect, a park brake includes a brake lever movable about a primary pivot and a secondary pivot. A release mechanism is associated with the brake lever. The release mechanism is actuable for allowing selective movement of the brake lever. The brake lever selectively rotates about the secondary pivot causing relative movement between the brake lever and the release mechanism.

In another aspect, a park brake includes a brake lever movable about a primary pivot and a secondary pivot. A cable attachment plate is associated with the brake lever. The brake lever selectively rotates about the secondary pivot changing a ratio of rotation of the brake lever relative to the cable attachment plate.

In another aspect, a park brake includes a brake lever movable about a primary pivot and a secondary pivot. A cable attachment plate is associated with the brake lever. A cable is connected to the cable attachment plate. The brake lever selectively rotates about the secondary pivot causing relative movement between the brake lever and cable attachment plate for isolating the cable from movement of the brake lever.

DETAILED DESCRIPTION OF THE PREFERRED EMBODIMENTS

Figure 1:
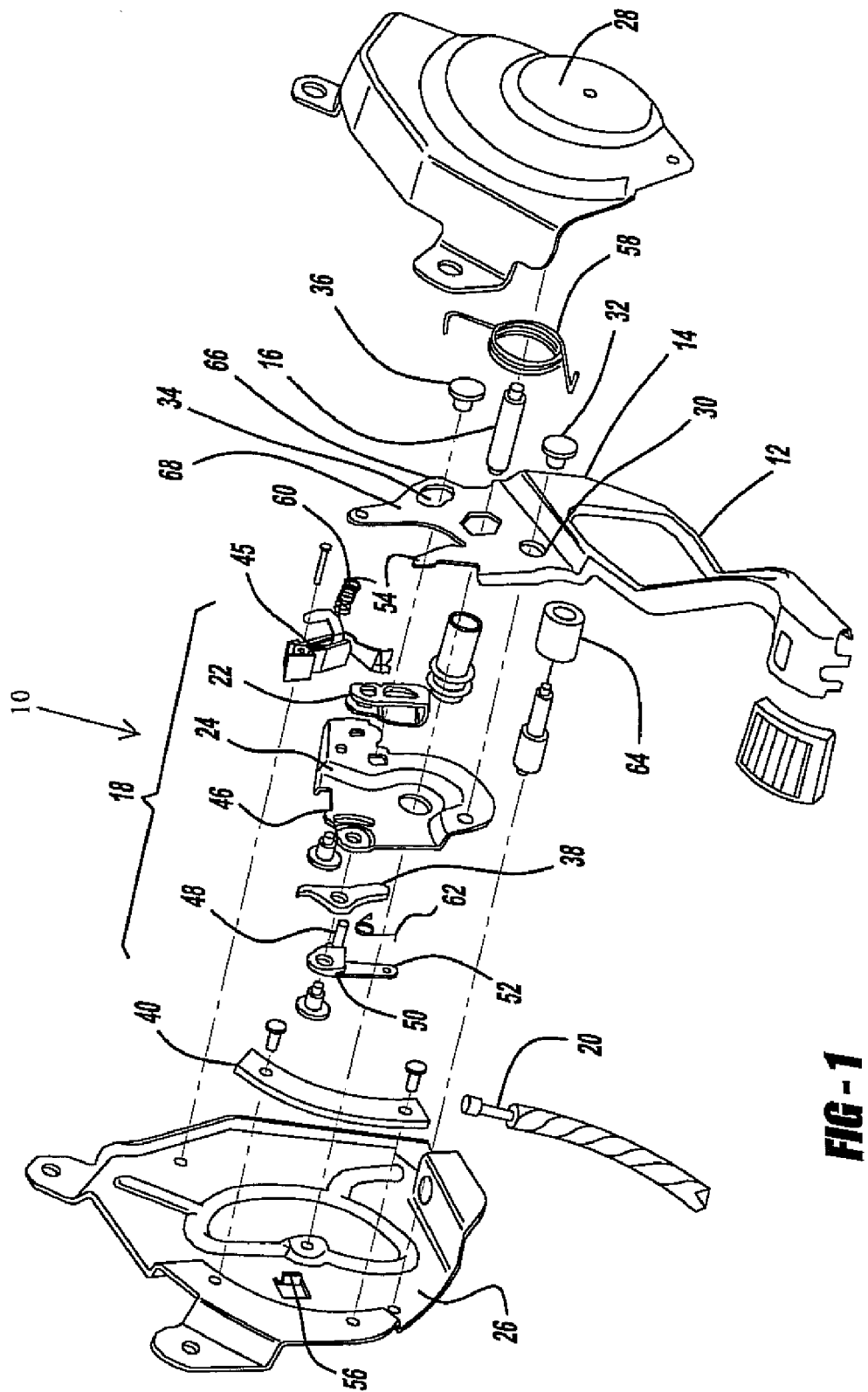
FIG. 1 is an exploded assembly view of a park brake.

Referring to FIG. 1, there is shown a park brake 10. The park brake 10 includes a brake lever 12 that is movable about a primary pivot 14 and a secondary pivot 16. A release mechanism 18 is associated with the brake lever 12. The release mechanism 18 is actuable to allow selective movement of the brake lever 12. A cable 20 is connected to the release mechanism 18. The cable 20 is isolated from movement of the brake lever 12. The cable 20 may be connected to the release mechanism 18 at a clevis 22, as shown in FIG. 1 or it may alternatively be attached using any other suitable connection mechanism, such as a cable track or other connection. Isolation of the cable 20 from movement of the brake lever 12 allows the release mechanism 18 to move independent of the brake lever 12 to minimize cable travel loss. The brake lever 12 selectively rotates about the primary pivot 14 causing relative movement between the brake lever 12 and the release mechanism 18 as well as isolates the release mechanism 18 and cable 20 from the brake lever 12.

As stated above, the brake lever 12 is movable about a primary pivot 14 coupled to a cable attachment plate 24 and a secondary pivot 16 coupled to a housing 26. The housing 26 may include a shape having various detents and contours formed thereon to define an overall travel path of the brake lever 12. The housing 26 may be attached to a vehicle using any suitable fastening method. The housing 26 may also include a corresponding cover plate 28 that attaches to the housing 26 and encloses the brake lever 12 and release mechanism 18. Additionally the housing 26 may include various slots, tabs and attachment members for connecting and contacting various components, as will be described in more detail below.

The brake lever 12 includes a hole 30 that receives a first rivet 32 or pin that defines the primary pivot 14. The brake lever 12 also includes a slot 34 formed therein that receives a second rivet 36 or pin that limits the relative movement of the brake lever 12 relative to the release mechanism 18, and transmits the force from the brake lever 12 to the cable attachment plate 24. It should be realized that alternative members other than a rivet may be utilized including a boss, projection, block or other such structure associated with the brake lever 12 or cable attachment plate 24. The second rivet 36 associated with the brake lever 12 is moveable within the slot 34 providing relative movement of the brake lever 12 relative to the cable attachment plate 24. The movement of the second rivet 36 with in the slot 34 further allows for actuating the release mechanism 18 to lock and unlock a pawl 38 from a sector 40. Additionally, the secondary pivot 16 provides for adjusting or changing a rotation ratio of the brake lever 12 relative to the cable 20.

A sector 40 is attached to the housing 26. The sector 40 may have an arcuate shape with a plurality of teeth 42 formed thereon for engaging the pawl 38. The teeth 42 may be positioned relative to each other and to the overall shape of the sector 40 to achieve various design characteristics. The teeth 42 may have a root-to-tip distance designed to minimize travel loss. The design parameters of the sector 40 allow for the pawl 38 to lock and unlock with the sector 40 to minimize cable travel loss in the park brake 10.

The park brake 10 includes a cable attachment plate 24 that is movable about the second pivot 16. The cable attachment plate 24 includes the pawl 38 pivotally attached thereon allowing the pawl 38 to lock and unlock from the sector 40. The cable attachment plate 24 may actuate a switch 45 associated therewith to provide sensing and control feedback for the park brake 10. The cable attachment plate 24 includes a trigger slot 46 formed therein for receiving a projection 48 formed on a trigger 50, as will be described in more detail below.

The trigger 50 as depicted rotates about the same axis as the pawl 38. It should be realized the trigger 50 may rotate on an independent axis relative to the pawl 38. The trigger 50 includes a leg portion 52 and the projection 48. The projection 48 is adapted to contact a brake lever tab 54. A housing tab 56 is adapted to contact the leg portion 52 to move the projection 48 within the trigger slot 46 formed in the cable attachment plate 24. Movement of the projection 48 within the trigger slot 46 actuates the release mechanism 18, as will be discussed in more detail below. It should be realized that other features of contact could control the relative movement of the trigger 50 described above.

The park brake 10 may include a return spring 58 that may be attached to the cover 28 at a first end of the return spring 58 with the second end attached to the cable attachment plate 24. The return spring 58 applies a force to the cable attachment plate 24 to return it to a nominal starting position relative to the housing 26. The park brake 10 may also include a biasing spring 60 connected to the brake lever 12 at one end of the biasing spring 60 and to the cable attachment plate 24 at another end of the biasing spring 60. The biasing spring 60 applies a force between the brake lever 12 and the cable attachment plate 24 that is less than and opposite that of the return spring 58. The force applied by the biasing spring 60 moves the brake lever 12 relative to the brake attachment plate 24, as will be discussed in more detail below. The park brake 10 also includes a pawl spring 62 having one end attached to the pawl 38 and another end attached to the trigger 50. The pawl spring 62 exerts a force vector on the pawl 38 to lock and unlock the pawl 38 from the sector 40. The force vector can be changed or adjusted in response to movement of the projection 48 on the trigger 50 within the trigger slot 46 formed in the brake attachment plate 24.

Figure 2A:
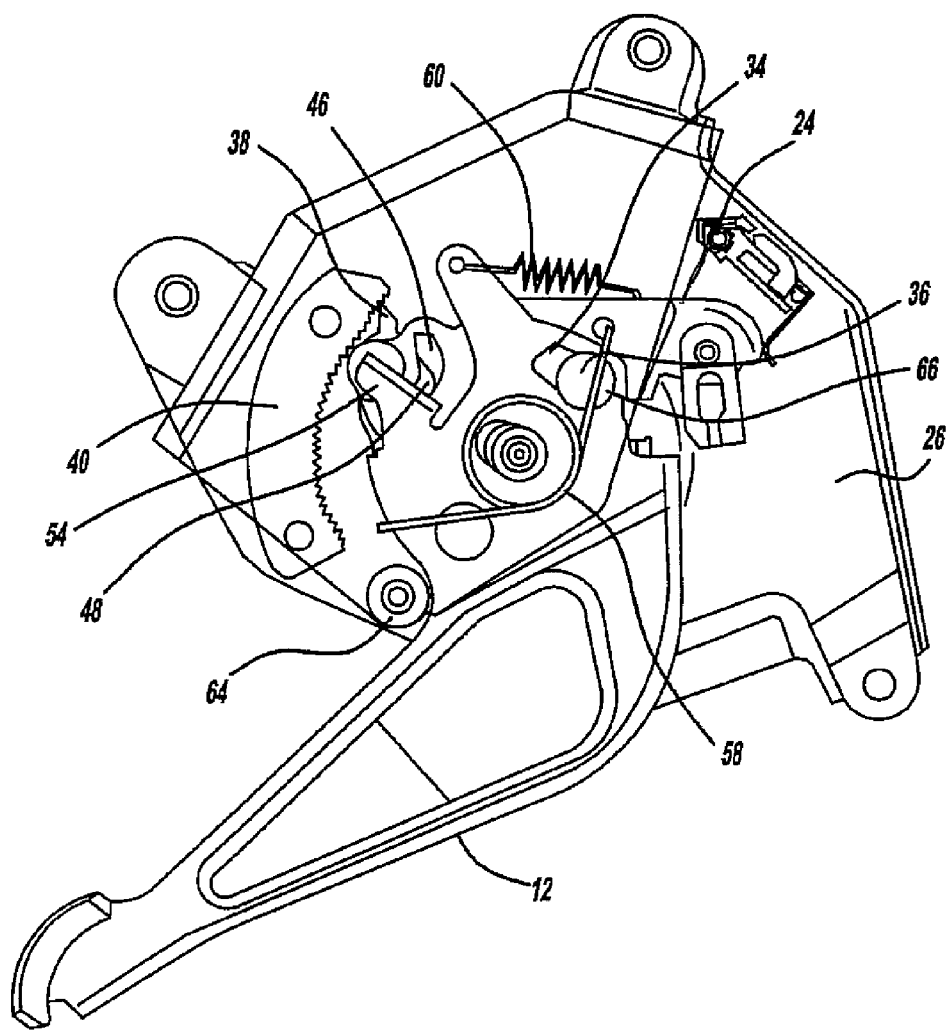
FIGS. 2A and 2B are a partial side view of a park brake in a fully released position.
Figure 2B:
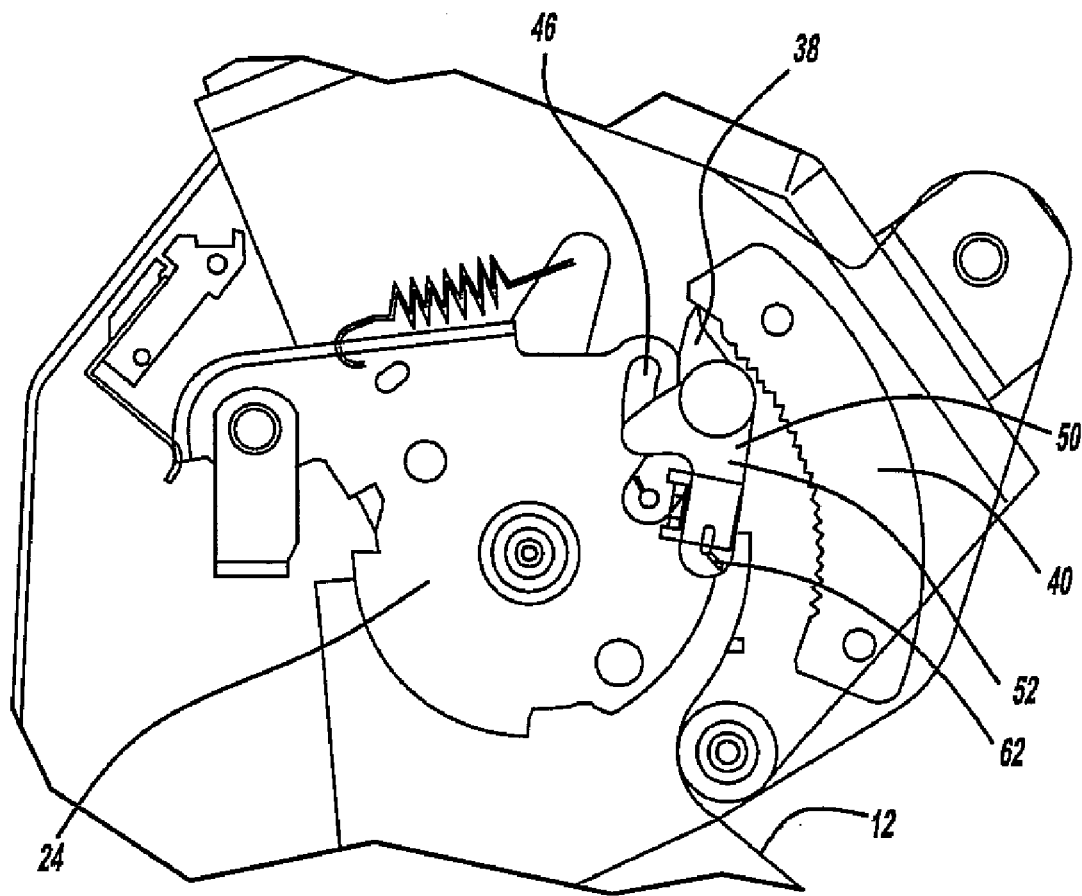

In use, the park brake 10 starts in a nominal position wherein the release mechanism 18 is fully released, as shown in FIGS. 2A and 2B. As can be seen in the figures, the brake lever 12 is located against a stop 64 attached to the housing 26. The return spring 58 rotates the cable attachment plate 24 to the starting or nominal position. The pawl 38 is rotated into the sector 40 as a result of the force vector of the pawl spring 62, but the pawl 38 is not locked with the sector 40 as there are no teeth 42 formed on the sector 40 at the start of the sector travel path. The projection 48 on the trigger 50 is positioned in a starting position within the trigger slot 46 formed in the cable attachment plate 24. The second rivet 36 defining a travel path is positioned at a first side 66 of the slot 34 formed in the brake lever 12. This position of the second rivet 36 in the slot 34 allows for immediate cable take-up as movement of the brake lever 12 causes a corresponding movement of the cable attachment plate 24.

Figure 3A:
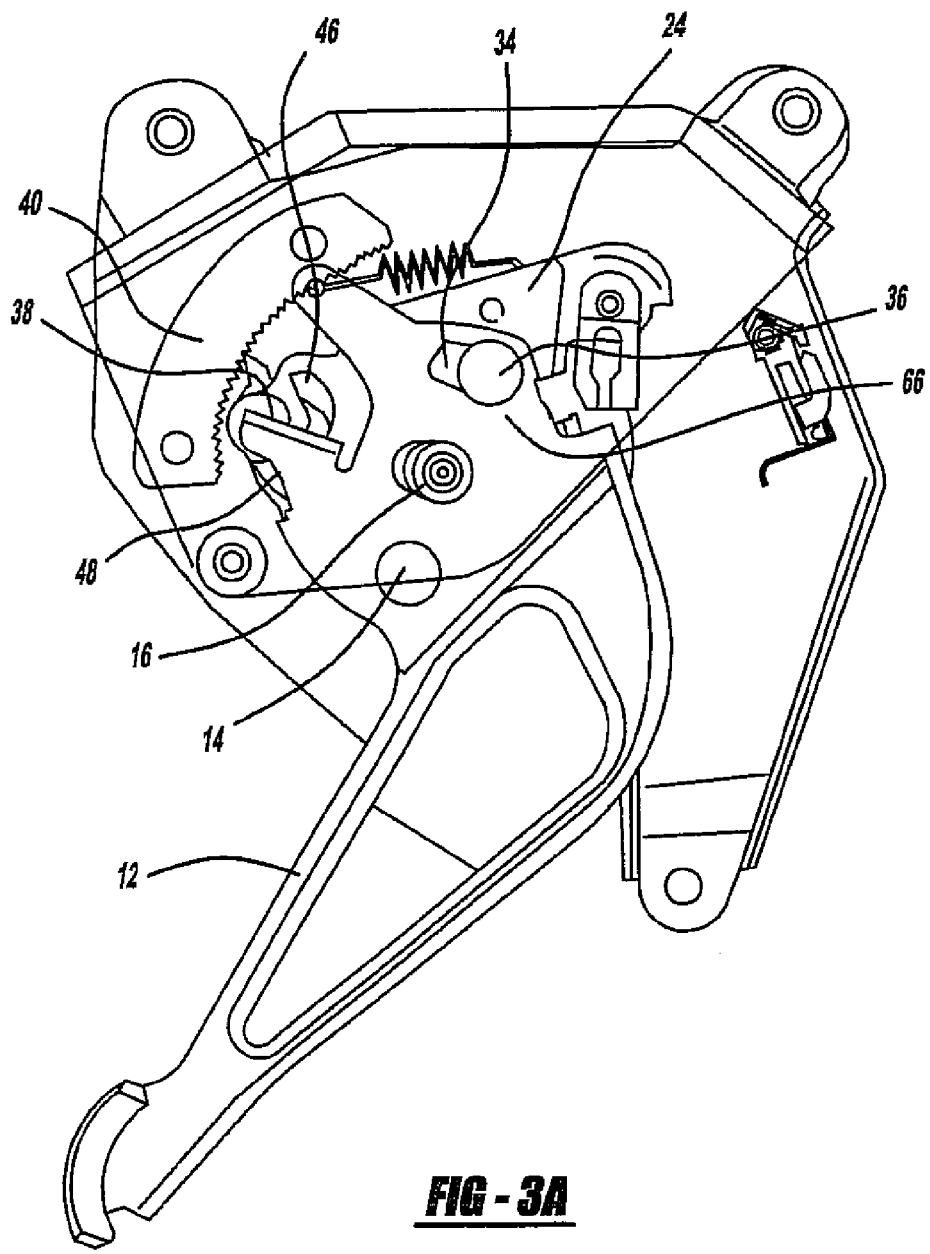
FIGS. 3A and 3B are a partial side view of a park brake in an applying position.
Figure 3B:
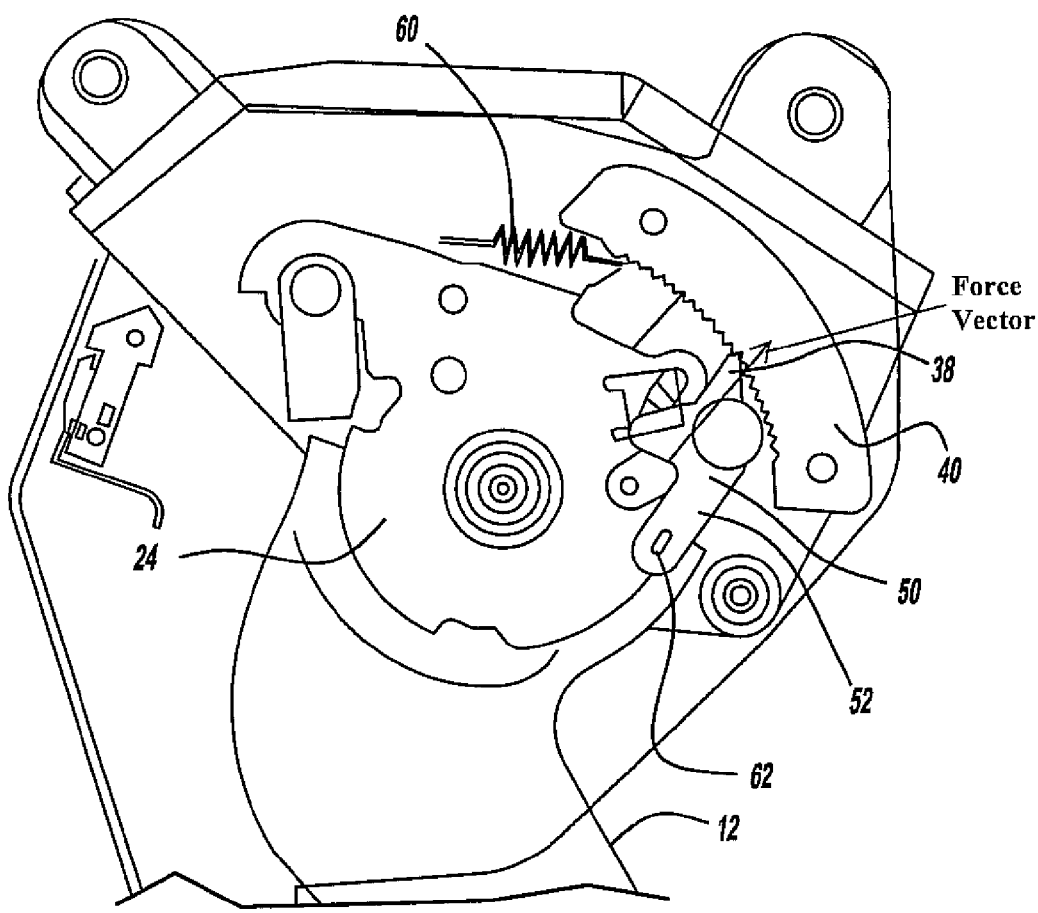

When an operator applies a positive force on the brake lever 12, the park brake 10 is in an applying position, as shown in FIGS. 3A and 3B. The force applied to the brake lever 12 causes rotation of the brake lever 12 about the secondary pivots 16. The second rivet 36 contacts the first end 66 of the slot 34 such that the force applied to the brake lever 12 causes the brake attachment plate 24 to rotate. The projection 48 on the trigger 50 remains in the starting position within the trigger slot 46 formed in the cable attachment plate 24. The pawl 38 can lock relative to the sector 40 due to the force vector applied by the pawl spring 62. A load is applied to the cable attached at the clevis due to the rotation of the cable attachment plate 24.

Figure 4A:
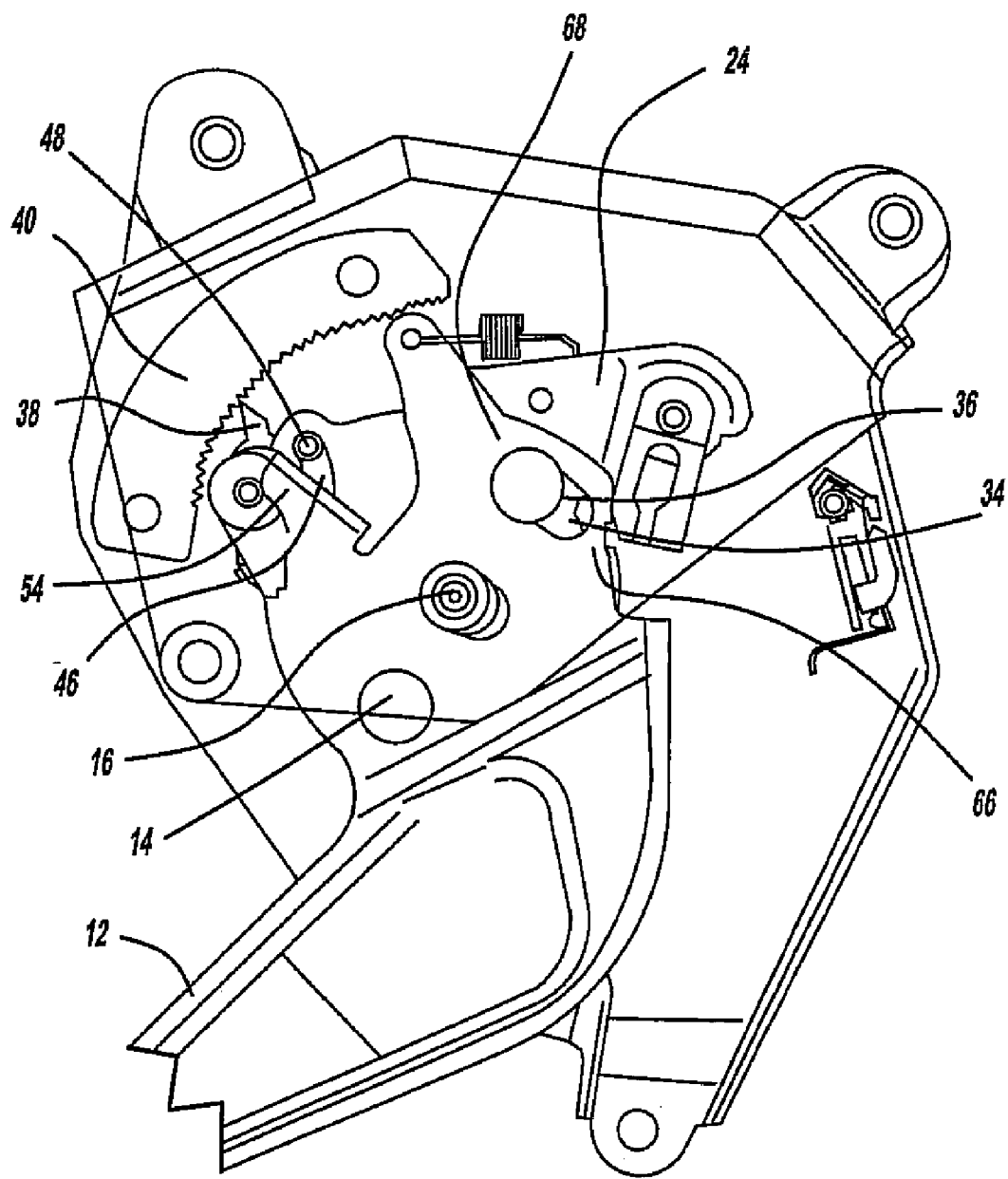
FIGS. 4A and 4B are a partial side view of a park brake in a locked position.
Figure 4B:
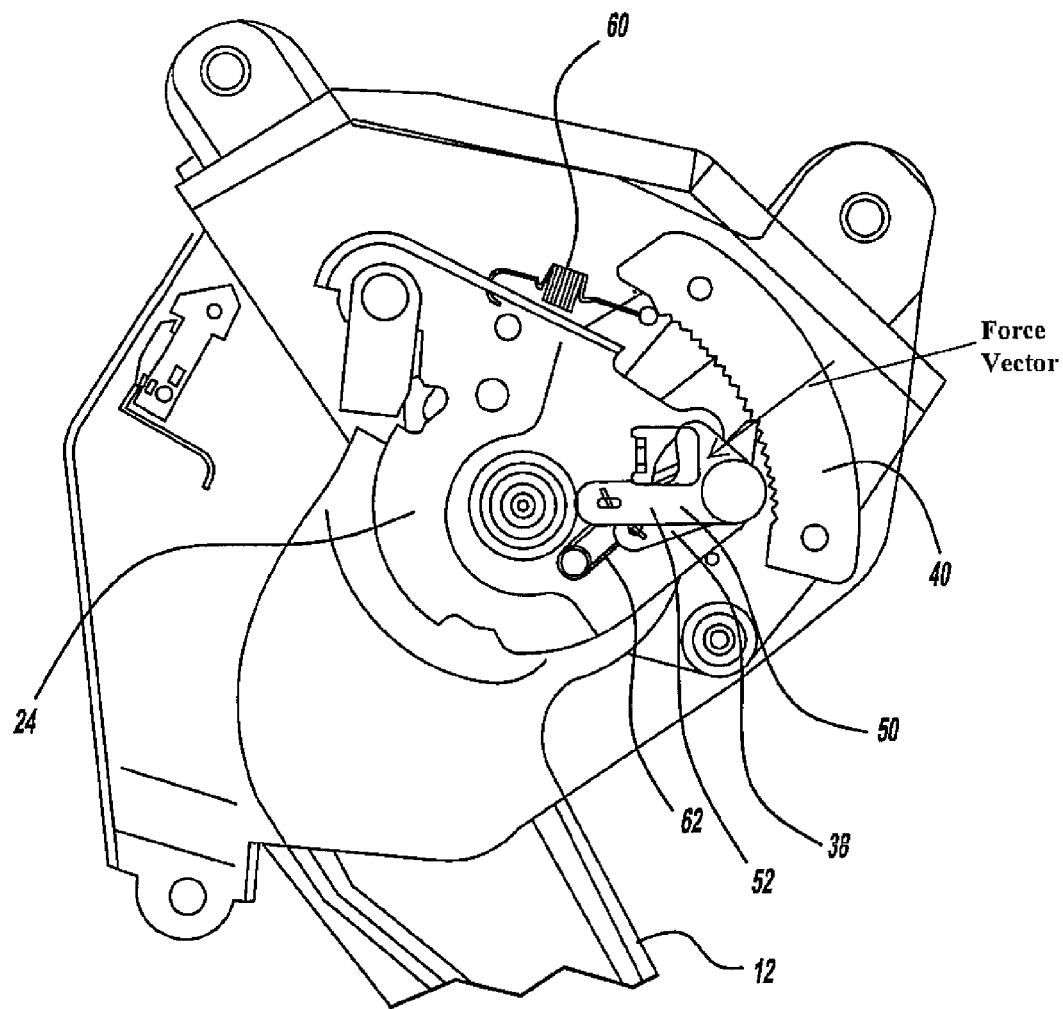

When the force is removed from the brake lever 12, the park brake 10 is then in the locked position, as shown in FIGS. 4A and 4B. In the locked position, the pawl 38 locks with the sector 40 such that the cable attachment plate 24 is locked in position. The biasing spring 60 connected to the brake lever 12 and cable attachment plate 24 causes the brake lever 12 to rotate relative to the cable attachment plate 24 moving the second rivet 36 to the second side 68 of the slot 34 formed in the brake lever 12. The brake tab 54 formed on the brake lever 12 contacts the projection 48 of the trigger 50 moving the projection 48 within the trigger slot 46 formed in the cable attachment plate 24 from the starting position to the secondary position. Movement of the projection 48 and trigger 50 in the trigger slot 46 causes the pawl spring 62 to rotate about the connection with the pawl 38. The force vector applied by the pawl spring 62 is changed as a result of the rotation of the pawl spring 62. The force vector is switched causing the moment of the pawl into the sector 40 in the starting position to a moment out of the sector 40 in the secondary position. The locking angle of the sector teeth 42 and pawl 38 geometry keeps the pawl 38 locked into engagement with the sector 40.

Figure 5A:
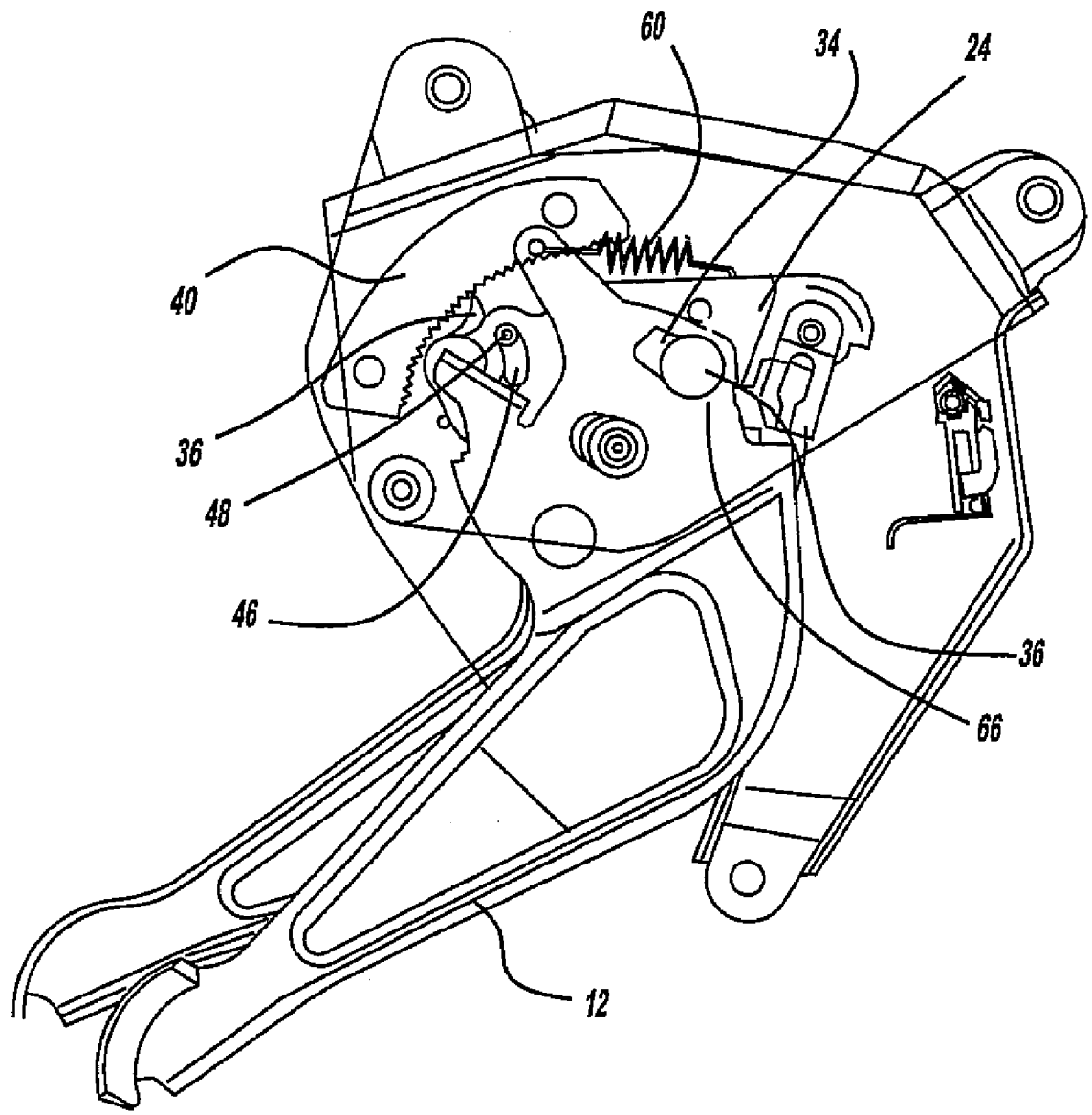
FIGS. 5A and 5B are a partial side view of a park brake in a reapplied position.
Figure 5B:
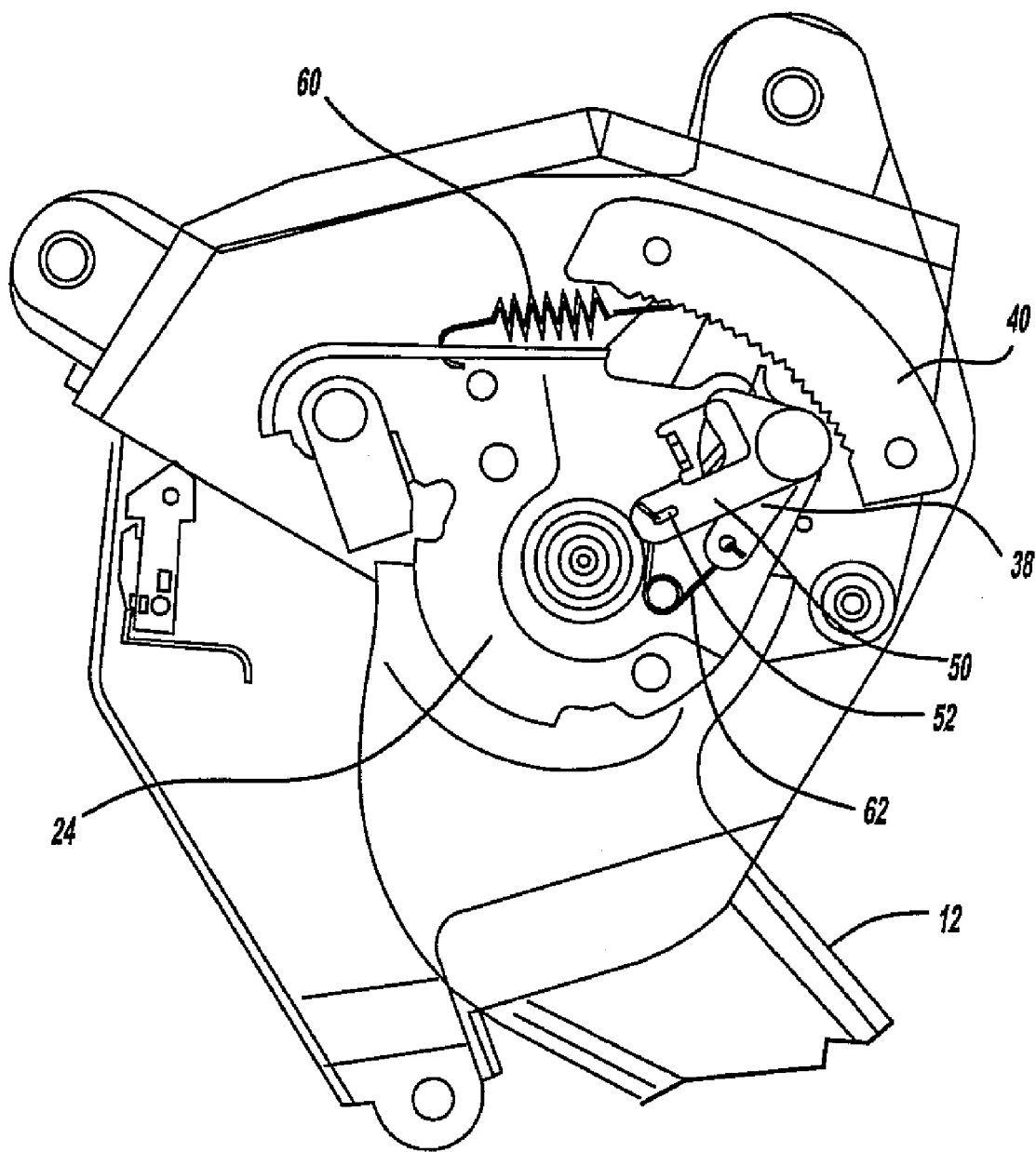

To release the brake lever 12 from the applied position where the release mechanism 18 is locked, a force is reapplied to the brake lever 12 as shown in FIGS. 5A and 5B. As can be seen in the figures, a force is applied to the brake lever 12 and the second rivet 36 is moved back to the first side 66 of the slot 34 formed in the brake lever 12, transferring the load that was applied to the pawl 38 when engaging the sector 40 to the second rivet 36. The projection 48 formed on the trigger 50 remains in the secondary position in the trigger slot 46 formed in the brake attachment plate 24. In this position, the pawl spring 62 exerts a force vector on the pawl 38 causing the pawl 38 to rotate out of the sector 40 unlocking the release mechanism 18.

Figure 6:
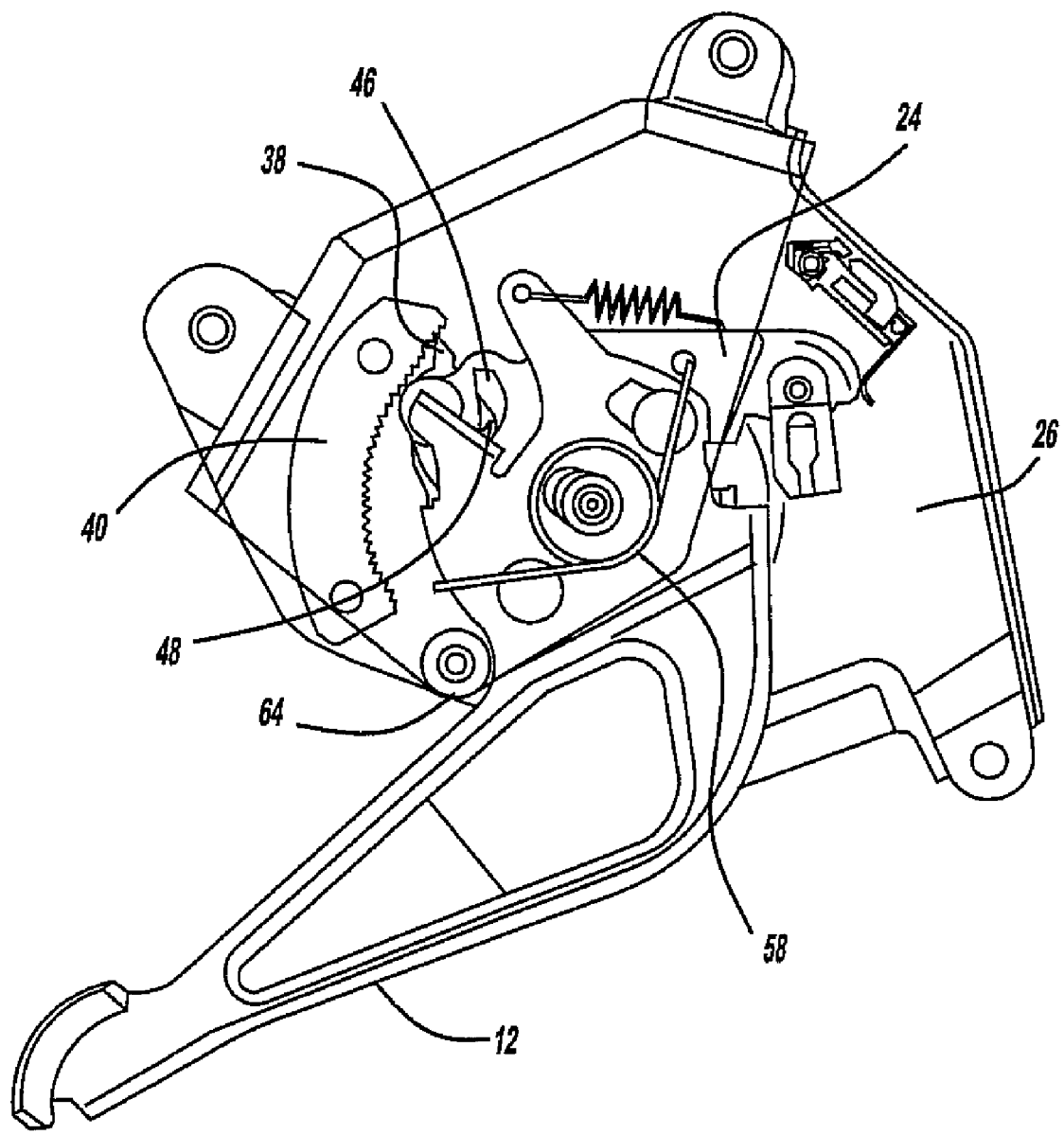
FIG. 6 is a partial side view of a park brake in a releasing position.

The force reapplied to the brake lever 12 is then removed allowing the park brake 10 to move to the unapplied or released position, shown in FIG. 6. In the released position, the brake lever 12 returns to the nominal or starting position. The force vector of the pawl spring 62 has caused the rotation of the pawl 38 out of the sector 40 to disengage the pawl 38 from the sector 40.

The brake lever 12 continues to travel towards the nominal position in response to the force applied by the return spring 58. As the brake lever 12 continues its travel toward the nominal position, the trigger leg 52 contacts a housing tab 56 located on the housing 26 moving the projection 48 in the trigger slot 46 from the secondary position to the starting position. In response to the movement of the projection 48 in the trigger slot 46, the pawl spring 62 rotates about the connection point to the pawl 38, again changing the force vector. The force vector is returned to the starting position and applies a moment to the pawl 38 into the sector 40. The brake lever 12 continues rotating until it contacts the stop 64 on the housing 26. The park brake 10 is now positioned in the fully released position with the brake lever 12 in the nominal position.

The park brake 10 described herein reduces cable travel loss from the independent movement of the release mechanism 18 and brake lever 12. Additionally, cable travel loss is minimized as movement of the brake lever 12 corresponds to immediate cable take up, as described above.

The invention has been described in an illustrative manner. It is to be understood that the terminology which has been used is intended to be in the nature of words of description rather than limitation. Many modifications and variations of the invention are possible in light of the above teachings.

Therefore, within the scope of the appended claims, the invention may be practiced other than as specifically described.

The invention claimed is:

1. A park brake comprising:
a brake lever movable about a primary pivot and a secondary pivot;
a cable attachment plate associated with the brake lever;
a housing having a sector fixedly attached thereon;
a pawl pivotally connected to the cable attachment plate, the pawl adapted to lock and unlock with the sector, the pawl having a pawl spring applying a switchable moment relative to the sector wherein a force vector is changed from in or out of the sector;
a trigger pivotally coupled to the cable attachment plate wherein the pawl spring has a first end and a second end, the first end attached to the pawl and the second end attached to the trigger;
wherein the primary pivot isolates movement of the brake lever relative to the cable attachment plate.

2. The park brake of claim 1 wherein the cable attachment plate is pivotally coupled to the housing.

3. The park brake of claim 2 wherein the brake lever includes a hole receiving a first rivet defining the primary pivot and a slot receiving a second rivet defining the limits of travel, the second rivet associated with the brake lever movable within the slot for decoupling movement of the brake lever and the cable attachment plate.

4. The park brake of claim 2 wherein a direction of the rotational moment of the pawl is independent of the pawl position.

5. The park brake of claim 4 including a biasing spring connected at one end to the cable attachment plate and at another end to the brake lever.

6. The park brake of claim 5 including a return spring attached at one end to the cable attachment plate and at another end to a fixed member relative to a vehicle.

7. The park brake of claim 1 wherein the trigger includes a projection disposed within a trigger slot formed in the cable attachment plate.

8. The park brake of claim 1 wherein the brake lever includes a brake lever tab adapted to contact the trigger.

9. The park brake of claim 8 wherein a force applied to the brake lever moves the brake lever tab contacting the trigger moving the trigger from a starting position to a secondary position relative to the trigger slot causing the pawl spring to rotate about the pawl changing a moment of the pawl relative to the sector.

10. The park brake of claim 9 wherein the moment of the pawl is into the sector in the starting position and out of the sector in the secondary position.

11. The park brake of claim 9 wherein the pawl unlocks from the sector in response to the force vector in the secondary position when a force is reapplied to the brake lever.

12. The park brake of claim 9 wherein the housing includes a housing tab formed thereon.

13. The park brake of claim 12 wherein the housing tab contacts the trigger moving the trigger from the secondary position to the starting position relative to the trigger slot causing the pawl spring to rotate about the pawl changing the moment of the pawl relative to the sector.

14. A park brake comprising:
a brake lever movable about a primary pivot and a secondary pivot;
a housing having a sector fixedly attached thereon;
a pawl pivotally connected to a cable attachment plate that is pivotal relative to the housing, the pawl adapted to lock and unlock with the sector, the pawl having a pawl spring applying a switchable moment relative to the sector wherein a force vector is changed from in or out of the sector;
a release mechanism associated with the brake lever;
a trigger pivotally coupled to the cable attachment plate wherein the pawl spring has a first end and a second end, the first end attached to the pawl and the second end attached to the trigger;
wherein the brake lever selectively rotates about the primary pivot causing relative movement between the brake lever and the release mechanism.

15. The park brake of claim 14 wherein the relative movement between the brake lever and the release mechanism actuates the release mechanism.

16. The park brake of claim 14 wherein the release mechanism includes a cable attachment plate associated with the brake lever.

17. The park brake of claim 14 wherein the trigger includes a projection disposed within a trigger slot formed in the cable attachment plate.

18. The park brake of claim 14 including a biasing spring connected at one end to the cable attachment plate and at another end to the brake lever and including a return spring attached at one end to the cable attachment plate and another end attached to a member fixed relative to a vehicle.

19. The park brake of claim 18 wherein the brake lever includes a tab adapted to contact the trigger and wherein a force applied to the brake lever moves the brake lever tab contacting the trigger moving the trigger from a starting position to a secondary position relative to the trigger slot causing the pawl spring to rotate about the pawl changing a moment of the pawl relative to the sector.

20. The park brake of claim 19 wherein the pawl unlocks from the sector in response to the force vector in the secondary position when a force is reapplied to the brake lever.

21. The park brake of claim 20 wherein the housing includes a housing tab formed thereon and wherein the housing tab contacts the trigger moving the trigger from the secondary position to the starting position relative to the trigger slot causing the pawl spring to rotate about the pawl changing a moment of the pawl relative to the sector.

22. The park brake of claim 14 including a cable attached to the release mechanism wherein cable travel loss is minimized.

23. A park brake comprising:
a brake lever movable about a primary pivot and a secondary pivot;
a housing having a sector fixedly attached thereon;
a pawl pivotally connected to a cable attachment plate that is pivotal relative to the housing, the pawl adapted to lock and unlock with the sector, the pawl having a pawl spring applying a switchable moment relative to the sector wherein a force vector is changed from in or out of the sector;
a trigger pivotally coupled to the cable attachment plate wherein the pawl spring has a first end and a second end, the first end attached to the pawl and the second end attached to the trigger;
wherein the brake lever selectively rotates about the primary and secondary pivots changing a ratio of rotation of the brake lever relative to a cable.

24. The park brake of claim 23 wherein the trigger includes a projection disposed within a trigger slot formed in the cable attachment plate.

25. The park brake of claim 24 including a biasing spring connected at one end to the cable attachment plate and at another end to the brake lever and including a return spring attached at one end to the cable attachment plate and another end attached to a member fixed relative to a vehicle.

26. The park brake of claim 25 wherein the brake lever includes a tab adapted to contact the trigger and wherein a force applied to the brake lever moves the brake lever tab contacting the trigger moving the trigger from a starting position to a secondary position relative to the trigger slot causing the pawl spring to rotate about the pawl changing a moment of the pawl relative to the sector.

27. The park brake of claim 26 wherein the pawl unlocks from the sector in response to the force vector in the secondary position when a force is reapplied to the brake lever.

28. The park brake of claim 27 wherein the housing includes a housing tab formed thereon and wherein the housing tab contacts the trigger moving the trigger from the secondary position to the starting position relative to the trigger slot causing the pawl spring to rotate about the pawl changing a moment of the pawl relative to the sector.

29. A park brake comprising:
- a brake lever movable about a primary pivot and a secondary pivot;
- a housing having a sector fixedly attached thereon;
- a pawl pivotally connected to a cable attachment plate that is pivotal relative to the housing, the pawl adapted to lock and unlock with the sector, the pawl having a pawl spring applying a switchable moment relative to the sector wherein a force vector is changed from in or out of the sector;
- a cable connected to the cable attachment plate;
- a trigger pivotally coupled to the cable attachment plate wherein the pawl spring has a first end and a second end, the first end attached to the pawl and the second end attached to the trigger;
- wherein the brake lever selectively rotates about the primary pivot causing relative movement between the brake lever and cable attachment plate for isolating the cable from movement of the brake lever.

* * * * *